United States Patent [19]
Rausch et al.

[11] Patent Number: 5,832,807
[45] Date of Patent: Nov. 10, 1998

[54] HYDRAULIC CONTROL FOR A DIVIDING MACHINE TOOL

[75] Inventors: Georg Rausch, Lohr/Main; Heinrich Wilkens, Isernhagen; Klaus Biermann, Fuldabrück; Georg Zöller, Kassel, all of Germany

[73] Assignees: Mannesmann Rexroth AG, Lohn/Main; Thyssen Industrie AG, Essen, both of Germany

[21] Appl. No.: 765,345

[22] PCT Filed: Jun. 8, 1995

[86] PCT No.: PCT/EP95/02222

§ 371 Date: Dec. 13, 1996

§ 102(e) Date: Dec. 13, 1996

[87] PCT Pub. No.: WO95/34399

PCT Pub. Date: Dec. 21, 1995

[30] Foreign Application Priority Data

Jun. 14, 1994 [DE] Germany ............... 44 20 682.8

[51] Int. Cl.⁶ .................................................. F15B 11/08
[52] U.S. Cl. ................... 91/420; 60/468; 60/494
[58] Field of Search ............... 91/420, 435; 60/468, 60/469, 494

[56] References Cited

U.S. PATENT DOCUMENTS

| | | | |
|---|---|---|---|
| 3,906,991 | 9/1975 | Haussler | 91/420 X |
| 4,172,582 | 10/1979 | Bobnar | 91/420 X |
| 4,244,275 | 1/1981 | Smilges | 91/420 |
| 4,624,445 | 11/1986 | Putnam | 91/420 X |
| 4,727,792 | 3/1988 | Haussler | 91/420 |
| 5,211,196 | 5/1993 | Schwelm | 91/420 X |
| 5,611,259 | 3/1997 | Nagata | 91/435 X |

FOREIGN PATENT DOCUMENTS

| | | |
|---|---|---|
| 551059 | 12/1959 | Belgium . |
| 3711384 | 3/1988 | Germany . |
| 4118569 | 12/1992 | Germany . |
| 546875 | 3/1946 | United Kingdom . |

*Primary Examiner*—Hoang Nguyen
*Attorney, Agent, or Firm*—Martin A. Farber

[57] ABSTRACT

A hydraulic control for a dividing machine tool, in particular a shear or cutting press, in which a damping device is provided in order to counteract a sudden downward movement of the working piston upon the cutting through of a workpiece during an operating stroke.

26 Claims, 1 Drawing Sheet

5,832,807

HYDRAULIC CONTROL FOR A DIVIDING MACHINE TOOL

FIELD AND BACKGROUND OF THE INVENTION

The present invention relates to a hydraulic control for a dividing machine tool.

Such hydraulic controls are used, in particular, in shearing presses or cutting presses by which workpieces are brought to predetermined lengths. Thus, for instance, scrap shears are known by which railway rails can be divided into pieces of short length before melting or recycling.

In such machine tools one distinguishes essentially between three individual strokes, during the first of which strokes (the closing stroke) the cutting tool is closed. This is then followed by the working stroke, in which the work piece is cut in two, while a last stroke performs the return movement, i.e. the opening of the tool in order to be able to remove or shift the workpiece.

In order to prevent an uncontrolled lowering of the cutting tool, a back pressure acts on the working piston of the machine tool during the closing stroke, it approximately compensating for the weight of the parts to be lowered.

In this way, assurance is had that the workpiece of the machine tool does not descend solely due to its own weight, so that the hydraulic pump must always operate against the back pressure and thus the hydraulic cylinder is always filled with hydraulic fluid.

During the working stroke, i.e. during the cutting of the workpiece, the back pressure is decreased so that the maximum cylinder force can be used for the actual cutting process.

Upon cutting the workpiece, the entire hydraulic pressure continues to act on the working piston, so that the latter is accelerated immediately after the cutting until the hydraulic pressure decreases due to the control of the machine tool and the return movement of the tool is commenced. This sudden acceleration of the working piston can lead to a tearing apart of the oil column on the pressure side in the work cylinder so that there is a sudden, uncontrolled movement of the working piston. This sudden change in speed of the work piston is also known as the "cutting shock" and it can lead to damage to the drive and hydraulic components of the machine tool.

SUMMARY OF THE INVENTION

In contradistinction to this, the object of the invention is to create a hydraulic control for a dividing machine tool with which, with a little apparatus expense, uncontrolled movement of the working piston can be prevented.

According to the invention the measure of providing a damping device, a damping pressure which opposes the downward movement of the working piston can be applied at the moment that the workpiece is cut through, so that the oil column on the pressure side in the work cylinder does not tear apart and thus sudden load peaks are counteracted.

The damping device is advantageously provided with means for limiting the maximum pressure so that hydraulic fluid can be expanded into a hydraulic tank when a maximum system pressure is exceeded.

A particularly simple control of this pressure-limiting valve device is obtained if, on the control side thereof, a predetermined control pressure is applied during the closing stroke which produces a back pressure which becomes inactive when an adjustable work level is reached and which can have a damping pressure superimposed on it or be replaced by a damping pressure which is greater than the control pressure. Thus, during the closing stroke, a back pressure acts which becomes inactive upon the work stroke when the work level is reached and then, upon the parting, increases to a higher damping-pressure level so that the cutting shock is reduced.

In accordance with an advantageous further development of the invention, the expansion control pressure can be taken from the feed line to the work cylinder, while the control pressure during the closing stroke is advantageously obtained from the return line.

The pressure in the feed line can then advantageously be fed by a bypass line into the control circuit of the pressure-limiting valve device. In this connection, a non-return valve and a flow valve, for instance a nozzle, can be arranged in series with one another in the bypass line.

In a further development of the invention, the control pressure is branched off to the work cylinder from the return line via another flow valve, for instance a nozzle, and the bypass line is allowed to debouch downstream of the flow valve into the control circuit.

Other advantageous embodiments of the invention are provided herein.

BRIEF DESCRIPTION OF THE DRAWINGS

One embodiment of the invention will be explained in further detail below with reference to a diagrammatic drawing in which.

DETAILED DESCRIPTION OF THE PREFERRED EMBODIMENT

Figure 1:
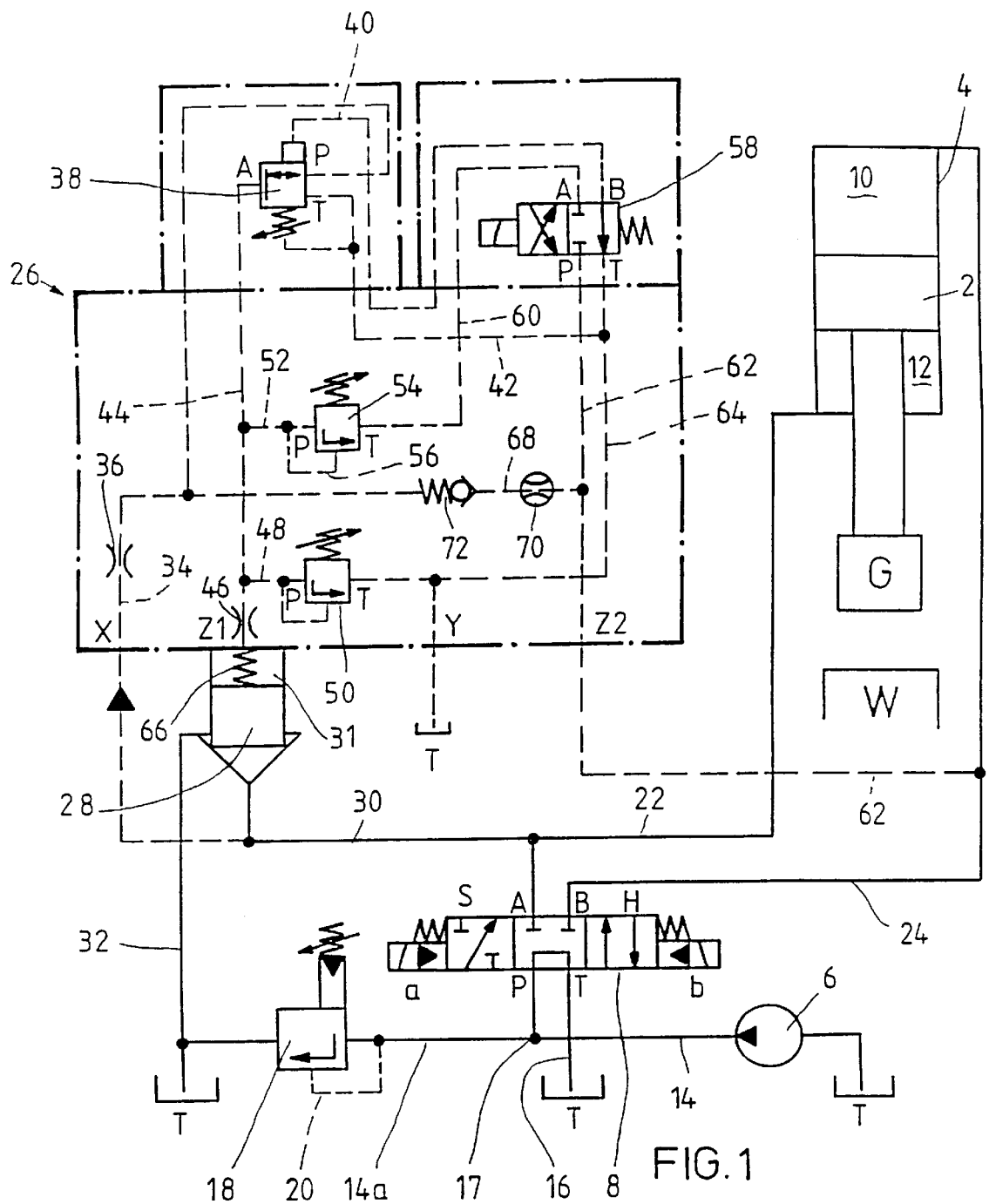
FIG. 1 is a circuit diagram of a hydraulic control having a damping in accordance with the invention.

The FIGURE shows a circuit diagram of a hydraulic control for a scrap shear in accordance with the invention. In this connection, a working piston 2 guided in a work cylinder 4 is supplied with hydraulic fluid by means of a hydraulic pump 6, each of the two cylinder chambers 10, 12 being adapted to be connected with a line conducting the pump pressure P or with a line leading to the tank T via a directional valve or similar control means, in particular a proportional valve 8.

For this purpose, in the embodiment shown the proportional valve 8 is developed as a pilot controlled 4/3-directional valve which can be controlled via electromagnets a,b and/or pilot control valves. In its basic position shown in the FIGURE, the valve slide is urged into its neutral position N by means of two springs.

From the hydraulic pump 6 a line section 14 leads to a connection P of the proportional valve 8. This connection P is connected in the neutral position N to a connection T of the proportional valve 8, which, in its turn, is connected via a tank-relief line 16 to the tank T.

From a branch 17 of the line section 14, a branch line 14a branches off in which there is connected a pilot controlled pressure-limiting valve the opening pressure of which is adjustable. The pressure prevailing in the branch line 14a is conducted via a control pressure line 20 to the control side of the pressure-limiting valve 18 so that, when a maximum pressure is exceeded, a connection to the tank T can be made via the pressure-limiting valve 18, and the pump conveys the hydraulic fluid into the tank T until the increase in pressure has been done away with.

From the outlet side of the proportional valve 8, a work line 22 (hereinafter referred to as return line 22) extends from a connection A to the lower cylinder chamber 12 in the FIGURE. Another work line 24 (in the following referred to as the feed line 24) leads from a connection B of the proportional valve 8 to the upper cylinder chamber 10 in the FIGURE of the working cylinder 4.

The working piston 2 is developed as a differential piston, the weight of the working piston 2 and of the tool indicated by G in the FIGURE.

In the neutral position N shown, the connections A and B are blocked while—as already mentioned—the connections T and P are connected to each other so that the hydraulic fluid is circulated into the tank T in the neutral position N (constant pump).

In the lift position, designated H in the FIGURE, of the valve slide of the proportional valve 8, the connections A, P and B, T respectively are connected to each other, so that the hydraulic fluid is conveyed via the line section 14, the connections P, A, and the return line 22 to the piston-rod-side cylinder chamber 12, while the hydraulic fluid can flow out of the piston-side cylinder chamber 10 via the feed line 24, the connections B, T, and the tank-relief line 16 into the tank T. In this way, the working piston 2 moves upward in the FIGURE, so that the tool of the machine tool moves away from the workpiece W and the scrap shear is opened.

In the "lower" position S of the valve slide, the two connections A and T are closed off, while the connections P and B are connected to each other so that hydraulic fluid is conveyed via the line section 19, the connections P, B, and the feed line 24 into the piston-side cylinder chamber 10 in order to lower the working piston 2 (closing stroke). In order to avoid controlled lowering, a back pressure is built up in the piston-rod-side cylinder chamber 12 which acts against the pump pressure in the feed line 24 and in the piston-side cylinder chamber 10.

The back pressure is limited via a valve device 26, which will be described in further detail below, to a value which is about 10 to 20% higher than the load pressure produced by the weight G.

When the preset back pressure is exceeded, a back pressure line 30 which branches off from the return line 22 downstream of the proportional valve 8, is connected via a control chamber 31 of a precontrolled power part, or value element, 28 to a connecting line 32 which leads to the tank T so that the pressure in the piston-rod-side cylinder chamber 12 can be broken down to the tank T and the preset back pressure maintained. The controlling of the power part 28 is effected via the valve device 26, the construction of which is explained below.

The valve device 26 which produces the control pressure for the control of the power part 28 has three connections X, Y and Z2, of which the connection X can be connected to the back pressure line 30 of the return line 22 and the piston-rod-side cylinder chamber 12, the connection Y can be connected to the tank T, and the connection Z2 can be connected to the feed line 24 and thus to the piston-side cylinder chamber 10. The control pressure for the power part 28 is present on another connection Z1.

A control line 34 which extends away from the inlet connection X leads, via a damping choke 36, to the input P of a pressure-controlled switch valve 38. The latter is prestressed via an adjustable spring into a position connecting the connection P with an output connection A (see FIGURE). On the other control side of the pressure-controlled switch valve 38, there is conducted a signal pressure line 40, so that, at a predetermined signal pressure, the valve slide of the pressure-controlled switch valve 38 can be displaced against the spring bias pressure and the connection A of the pressure-controlled switch valve 38 can be connected with a connection T from which a relief line 22 leads to the connection Y of the valve device 26 and thus to the tank T. From the relief line 42, a signal pressure line 40 leads back to the spring prestressed control side.

From the output connection A of the pressure-controlled switch valve 38, a control-pressure line section 46 extends via a choke 46 to the connection Z1 of the valve device 26 and thus to the control side of the power part 28. In the region between the choke 46 and the connection A, a branch line 48 branches off, into which line there is switched a maximum-pressure limiting valve 50 by which the pressure in the branch line 48, and thus in the control-pressure line section 44 can be relieved via the connection Y into the tank T as soon as the preadjustable maximum value for the control pressure in the control circuit has been reached.

Between the connection A and the branch line 48, another branch line 52 branches off in which there is provided a back pressure limiting valve 54. This back pressure limiting valve 54 is also preadjustable, so that when a predetermined back pressure is exceeded, it is conducted via a control pressure line 56 branching off from the other branch line 52 to the control side of the back pressure limiting valve 54 and in this way the piston slide is brought into a position connecting the connections P and T of the back pressure limiting valve 54 to each other, so that the pressure in the control circuit can be relieved via a switch valve 58, described in further detail below, and the connection Y into the tank T of the hydraulic valve.

As already mentioned above, the back pressure is so adjusted that it is about 10 to 20% above the load pressure produced by the weight G. Ordinarily, the back pressure thus produced lies in the range of 100 to 150 bar. The maximum pressure to be switched via the maximum-pressure limiting valve 50 is substantially higher than this back pressure, which is essentially presettable via the back pressure limiting valve 54.

The above-mentioned switch valve 58 is developed as an electromagnetically actuatable 4/2-way directional valve, the control line section 60 leading from the connection T of the back pressure limiting valve being conducted to a connection A of the switch valve. The control side of the pressure-controlled switch valve 38 is connected via the signal pressure line 40 to a connection B of the switch valve 58.

The pressure in the piston-side cylinder chamber 10 is conducted via a signal pressure line 62 to the connection Z2 of the valve device 26 and further to a connection P of the switch valve 58. From a tank connection T of the switch valve 58, a relief line 64 leads to the connection Y of the valve device 26.

In its neutral position N, the valve slide of the switch valve is urged by spring bias pressure into a position in which the connections A and P are blocked while the connections B and T are connected to each other, so that the control pressure in the upper control side in the FIGURE of the pressure-controlled switch valve 38 is reduced via the single pressure line 40, the connections B and T of the switch valve 58, the relief line 64 and via the connection Y of the valve device 26 into the tank T so that the valve slide of the pressure-controlled switch valve 38 is urged by spring action into the position thereof which connects the connections A and P of the pressure-controlled switch valve 38 together.

In the position G of the valve slide, the connections P, B, on the one hand, and the connections A, T of the switch valve 58 on the other hand are connected with each other. In this case, the pressure in the piston-side cylinder chamber 10 is conducted over the signal pressure line 62, the connections P, B of the switch valve 58, and the signal pressure line 40 to the control side of the pressure controlled switch valve 38, so that its control slide is brought against the spring bias pressure into the position thereof which connects the connections A and T with each other and in which the pressure in the control pressure line section 14, and thus the pressure on the control side of the power part 28, can be relieved to the tank T via the connections A, T of the pressure-controlled switch valve 38, the relief lines 42, 64 and the connection Y. In other words, in this switch position, the control pressure on the control side of the power part 28 is determined solely by a mechanical prestressing device, such as, for instance, a spring 66.

From the signal pressure line 62, a bypass line 68 branches off, it debauching into the control pressure line 34 between the choke 36 and the pressure-controlled switch valve 38.

A choke 70 and non-return valve 72 are connected in series in the bypass line 68. By means of the non-return valve 72, a fluid flow from the control pressure line 34 via the bypass line 68 to the signal pressure line 62 is prevented, while a flow in opposite direction upon the exceeding of a pressure predetermined by the spring bias tension of the non-return valve 72 is possible. In this way, the pressure in the piston-side cylinder chamber 10 can be fed via the bypass line 68 into the control circuit for controlling the power part 28.

For a better understanding of the function, the switch processes during the closing stroke, the working stroke, and the return movement of the working piston 2 will be explained below.

Lowering of the Working Piston 2 (Closing Stroke)

For the lowering of the working piston 2, the magnet a of the proportional valve 8 is provided with current so that the valve slide of the proportional valve 8 is displaced from its neutral position N into the position S. In this position S, as already mentioned, the connections P and B of the proportional valve 8 are connected to each other, while the connections A and T are blocked. In this way, hydraulic fluid is pumped by the pump 6 into the piston-side cylinder chamber 10 so that the piston is lowered. The lowering is effected against a back pressure in the piston-rod-side cylinder chamber 12 which is established via the power part 28 and the valve device 26.

In this connection, the control pressure corresponding to the pressure in the cylinder chamber 12 is conducted via the connection X of the valve device 26 to the connection P of the pressure-controlled switch valve 38. Upon the downward movement of the working piston 2, the magnet a of the switch valve 58 is also provided with current, so that the valve slide of this valve is in the position in which the connections P, B and A, T respectively are connected to each other and the pressure in the piston-side cylinder chamber 10 is present on the control side of the pressure-controlled switch valve 38, which pressure, however, is still not sufficient to bring the valve slide of the pressure-controlled switch valve 38 into its position connecting the connections A, T. As a result, the connections A, P of the pressure-controlled switch valve 38 are connected with each other so that the control pressure is conducted in the control pressure line 34, the connections A, P of the pressure-controlled switch valve 38, the control pressure line section 44 and the choke 46 on the control side of the power part 28. The back pressure upon the lowering of the working piston 2 is then determined by the back pressure limiting valve 54 the input connection P of which can be connected via the tank connection T and the control-line section 60, the connections A, T of the switch valve 58, and the connection Y to the tank T if the back pressure exceeds a preset value.

Working Stroke (Cutting of the Workpiece)

As soon as the tool of the scrap shear comes against the workpiece W, the pressure in the piston-side cylinder chamber 10 increases greatly, whereby the control pressure in the signal pressure lines 40, 62 also increases, so that the valve slide of the pressure-controlled switch valve 38 is brought out of its position shown in the FIGURE, against the bias tension of the spring, into its position connecting the connections A and T, and the control pressure in the control-pressure line section 36 can be relieved into the tank T via the relief lines 42, 64 and the connection Y. In this way, the spring bias pressure of the power part 28 is determined solely by the action of the spring 66 so that, as a result of the comparatively low spring initial tension over the power part 28, the pressure in the back pressure line 30 is relieved into the tank T, and the back pressure decreases to zero and the full cylinder pressure can be used for the cutting of the workpiece W.

Cutting Shock

Upon the cutting of the workpiece W, the full cylinder force acts on the working piston 2 so that a back pressure must be built up in order to prevent the above-described cutting shock.

By the sudden elimination of the resistance applied by the workpiece, the pressure in the piston-side cylinder chamber 10 drops, as a result of which the control pressure on the control side of the pressure-controlled switch valve 38 also decreases and the latter is again moved into its basic position, shown in the FIGURE, in which the connections A and P are connected to each other via valve slide so that—as described above—the pressure prevailing in the piston-rod-side cylinder chamber 12 can be built up as control pressure or as back pressure on the control side of the power part 28. The building-up of this back pressure takes place, however, too slowly to assure effective damping of the cutting shock. In order to accelerate the build-up of pressure, the greater pressure in the piston-side cylinder chamber 10 is fed via the bypass line 68, the choke 70 and the non-return valve 72, into the control-pressure line 34, which pressure is conducted via the connections P, A of the pressure-controlled switch valve 38 and the control pressure line section 44, the choke 46 to the connection Z1 and thus to the control side of the power part 28, so that a sufficient pressure builds up very rapidly on the control side of the power part 28 in order to block the connection between the back pressure line 30 and the connecting line 32 to the tank T. By the action of the comparatively high pressure in the piston-side cylinder chamber 10, the power part 28 can thus be brought very rapidly into its closed position so that a back pressure can build up very rapidly in the piston-rod-side cylinder chamber 12.

By this measure, the cutting shock is effectively damped so that damage to and overloading of the parts of the scrap shear upon the cutting of workpieces is prevented.

Return Movement of the Working Piston 2

For the return movement of the working piston 2, the electromagnet b of the proportional valve 8 is provided with current so that its valve slide is brought into the H position in which the connections A, P and B, T respectively are connected to each other. Furthermore, the electromagnet a of the switch valve 58 becomes without current so that its valve slide is brought by the initial spring tension into the neutral position N shown in the FIGURE, in which the connections A and P are blocked, while the connections B and T are connected to each other. In this way, the control side of the pressure-controlled switch valve 38 is connected with the tank T so that its control slide remains in the position connecting the connections A, P, solely as a result of the spring initial tension.

The section of the control line of the back pressure limiting valve 54 which leads away from the tank connection T is blocked by the switch valve 58 so that a higher pressure than the preset holding pressure can be adjusted in the control pressure line section 44 and thus on the control side of the power part 28. Since in this switch position, the pressure at the inlet of the power part 28 (line section 30) and at the control side of the power part 28 are the same, the power part 28 is held by the action of the spring 66 in its closed position in which the connection between the back pressure line 30 and the connecting line 32 is blocked off.

Thus, hydraulic fluid can be pumped by the pump via the connections P, A and the return line 22 into the piston-rod-side cylinder chamber 12 so that the working piston 2 is moved back into its initial position shown in the FIGURE. The hydraulic fluid displaced from the piston-side cylinder chamber 10 is discharged via the feed line 24, the connections B, T of the proportional valve 8, and the tank relief line 16 into the tank T.

Of course, the circuit shown can be expanded so that, in order to handle more complicated operating tasks, a control for the differential downward movement of the working piston can also be provided.

The method of the invention, thus, for the first time, provides an effective cutting shock damping which can be produced in simple manner and without fundamental changes in the control block.

We claim:

1. A hydraulic control for a dividing machine tool, suitable for a shear or cutting press, a work cylinder of which can be controlled via a valve device so that hydraulic fluid can be fed to a work piston for a work stroke, for a forward closing stroke and for return movement away from a workpiece, wherein a back pressure valve device is provided in order to control a closing stroke of the work piston against a predetermined back pressure, in the manner that a connection is opened and closed between a tank of the hydraulic system and a return line from the work cylinder, wherein there is provided a damping device with a pressure limiting valve device (26), the work cylinder (4) having a first, piston side, chamber (10), and the hydraulic control further comprises a pressure controlled switch valve (38) in circuit via the pressure limiting valve device (26) with a second, piston-rod-side, cylinder chamber (12) of the work cylinder (4), and a switch valve(58) in circuit via the pressure limiting valve device (26) with the first cylinder chamber (10) of the work cylinder (4); and wherein a signal pressure for control of the switch valve (38) is provided for adjustment of pressure of the second cylinder chamber (12), the switch valve (58) serving also to direct pressure of the first cylinder chamber (10) to a pressure relief section of the damping device (26) during the forward closing stroke, whereby the damping device serves for applying a damping pressure which counteracts a sudden downward movement upon cutting of the workpiece (W) during the work stroke of the work piston (2).

2. A hydraulic control according to claim 1, wherein the damping device has a pressure limiting valve device (26) via which, upon the exceeding of a maximum damping pressure, the hydraulic fluid in the return line (22) can be relieved into tank (T).

3. A hydraulic control for a dividing machine tool, suitable for a shear or cutting press, a work cylinder of which can be controlled via a valve device so that hydraulic fluid can be fed to a work piston for a work stroke, for a forward closing stroke and for return movement away from a workpiece, wherein a back pressure valve device is provided in order to control a closing stroke of the work piston against a predetermined back pressure, in the manner that a connection is opened and closed between a tank of the hydraulic system and a return line from the work cylinder, wherein there is provided a damping device with a pressure limiting valve device (26), the work cylinder (4) having a first, piston side, chamber (10), and the hydraulic control further comprises a pressure controlled switch valve (38) in circuit via the pressure limiting valve device (26) with a second, piston-rod-side, cylinder chamber (12) of the work cylinder (4), and a switch valve(58) in circuit via the pressure limiting valve device (26) with the first cylinder chamber (10) of the work cylinder (4); and wherein a signal pressure for control of the switch valve (38) is provided for adjustment of pressure of the second cylinder chamber (12), the switch valve (58) serving also to direct pressure of the first cylinder chamber (10) to a pressure relief section of the damping device (26) during the forward closing stroke, whereby the damping device serves for applying a damping pressure which counteracts a sudden downward movement upon cutting of the workpiece (W) during the work stroke of the work piston (2);

wherein the damping device has a pressure limiting valve device (26) via which, upon the exceeding of a maximum damping pressure, the hydraulic fluid in the return line (22) can be relieved into tank (T); and wherein for the limiting of the back pressure, a control pressure which can be limited via a back pressure valve device (54) can be applied to a control side of the pressure-limiting valve device (26), and, for the damping, a damping control pressure which is greater than the control pressure can be applied on the control side.

4. A hydraulic control according to claim 3, wherein the damping control pressure which branches off from a feed line (24) to the work cylinder (4) is fed via a bypass line (68), and a flow valve (70) and a non-return valve (72) are connected one behind the other therein.

5. A hydraulic control according to claim 2, wherein the control pressure can be relieved by the pressure controlled switch valve (38) into the tank (T) and a control side of which can be connected with the feed line (24) is connected in a control circuit of the pressure limiting valve device (26).

6. A hydraulic control for a dividing machine tool, suitable for a shear or cutting press, a work cylinder of which can be controlled via a valve device so that hydraulic fluid can be fed to a work piston for a work stroke, for a forward closing stroke and for return movement away from a workpiece, wherein a back pressure valve device is provided in order to control a closing stroke of the work piston against a predetermined back pressure, in the manner that a connection is opened and closed between a tank of the hydraulic system and a return line from the work cylinder, wherein there is provided a damping device with a pressure limiting valve device (26), the work cylinder (4) having a first, piston side, chamber (10), and the hydraulic control further comprises a pressure controlled switch valve (38) in circuit via the pressure limiting valve device (26) with a second, piston-side, cylinder chamber (12) of the work cylinder (4), and a switch valve (58) in circuit via the pressure limiting valve device (26) with the first cylinder chamber (10) of the work cylinder (4); and wherein a signal pressure for control of the switch valve (38) is provided for adjustment of pressure of the second cylinder chamber (12), the switch valve (58) serving also to direct pressure of the first cylinder chamber (10) to a pressure relief section of the damping device (26) during the forward closing stroke, whereby the damping device serves for applying a damping pressure which counteracts a sudden downward movement upon cutting of the workpiece (W) during the work stroke of the work piston (2);

wherein the damping device has a pressure limiting valve device (26) via which, upon the exceeding of a maximum damping pressure, the hydraulic fluid in the return line (22) can be relieved into tank (T); and wherein the hydraulic control further comprises a flow valve (46) provided in the control circuit downstream of the back pressure valve device (54).

7. A hydraulic control according to claim 3, wherein a control line (34) which conducts the control pressure branches off from the return line (22) and has, in the branching region, another control valve (36), preferably a nozzle.

8. A hydraulic control according to claim 7, wherein the bypass line (68) debouches into the control line (34) downstream of said further flow valve (36).

9. A hydraulic control according to claim 3, wherein the pressure limiting valve device (26) has a power part (28) which is prestressed into its closed position by the action of the control pressure and/or of the damping control pressure and spring action.

10. A hydraulic control according to claim 3, further comprising a maximum-pressure limiting valve (50) by which the pressure in the control circuit can be limited to a maximum values provided in the control circuit.

11. A hydraulic control according to claim 4, wherein the pressure limiting valve device (26) has a power part (28) which is prestressed into its closed position by the action of the control pressure and/or of the damping control pressure and spring action.

12. A hydraulic control according to claim 4, further comprising a maximum-pressure limiting valve (50) by which the pressure in the control circuit can be limited to a maximum value, provided in the control circuit.

13. A hydraulic control according to claim 4, wherein the flow valve (70) is a nozzle.

14. A hydraulic control according to claim 6, wherein the flow valve (46) is a nozzle.

15. A hydraulic control according to claim 7, wherein the control valve (36) is a nozzle.

16. Hydraulic control for a dividing machine tool, suitable for a shear or a cutting press, with a work cylinder (4) that can be moved in one direction in a closing stroke and a work stroke, and in the opposite direction in a return stroke, said work cylinder having a first cylinder space (10) on the piston side and a second cylinder space (12) on the piston rod side, wherein pressure medium can be forced from the second cylinder space (12) through a return line (22) into a tank (T) with a pilot damping device (26) incorporated into return line (22);

wherein the pilot damping device (26) connects with a main valve element (28) upon which, in an opening direction, the pressure in the second cylinder space (12) acts and in the closing direction a control pressure present in a control chamber (31) of the main valve element (28) acts;

wherein said control chamber (31) is in a control circuit, said control chamber (31) being capable of being impacted by a control pressure that corresponds to a retaining pressure in the second cylinder chamber (12) and at a control pressure limiting valve (54) of the damping device (26) to which, during the closing stroke, control oil flows from the return line (22) through a control line (34) that branches off return line (22);

wherein the hydraulic control includes a pilot valve (38) and a non-return valve (72), and said control chamber (31) is capable of being relieved of the control pressure during the work stroke through the pilot valve (38) controlled by the pressure in the first cylinder space (10), and said control chamber (31), at the end of the work stroke, is capable of being exposed to a control pressure that corresponds to a damping pressure in said second cylinder space (12);

wherein the control pressure, corresponding to the damping pressure, is capable of being increased by an influx of control oil from the first cylinder space (10) through a bypass line (68) into the control chamber (31), and with the non-return valve (72) that has a blocking action on the first cylinder space (10) being provided in the bypass line (68).

17. A hydraulic control according to claim 16, wherein a nozzle (70) is located in bypass line (68) that is in series with the non-return valve (72).

18. A hydraulic control according to claim 16, wherein a control side of pilot valve (38) is controlled by the pressure in the first cylinder space (10) and can be connected with a supply line (24) that leads to the first cylinder space (10).

19. A hydraulic control according to claim 16, wherein a nozzle (46) is located in the control circuit between the inlet of the control pressure limiting valve (54) and the control chamber (31).

20. A hydraulic control according to claim 16, wherein a nozzle (36) is located in the control line (34) that branches off return line (22).

21. A hydraulic control according to claim 20, wherein the bypass line (68) debouches into the control line (34) downstream of said flow valve (36).

22. A hydraulic control according to claim 21, wherein the pilot valve (38) that is controlled by the pressure in the first cylinder space (10) is a switching valve that connects the control chamber (31) in a first switching position with a portion of the control line (34) that is located downstream from the inlet of the bypass line (68) and in a second closed position connects the control chamber (31) by a relief line (42).

23. A hydraulic control according to claim 16, wherein the main valve element (28) is biased by a spring (66) into its closed position.

24. A hydraulic control according to claim 16, wherein a second control pressure limiting valve (50) is located in the control circuit (31), by which valve the control pressure can be limited to a value that is above the value for which the first-mentioned control pressure limiting valve (54) is set.

25. A hydraulic control according to claim 16, wherein an additional pilot valve (58) is provided in the control circuit and is designed as a switching valve, said additional pilot valve (58) connecting the outlet of control pressure limiting valve (54) with a relief line (64) in a first switch position, and shutting it off in a second switch position assumed during the return stroke of work cylinder (4).

26. A hydraulic control according to claim 25, wherein a control side of pilot valve (38) that is controlled by the pressure in the first cylinder space (10) is connected in the first switch position of the additional pilot valve (58) with a feed line (24) that leads to the first cylinder space (10) and in the second switch position of the additional pilot valve (58) is connected with a relief line (64).

* * * * *